(12) United States Patent
Wang et al.

(10) Patent No.: US 11,714,995 B2
(45) Date of Patent: Aug. 1, 2023

(54) METHOD FOR DISTRIBUTED TYPE TRAINING ADAPTATION AND APPARATUS IN DEEP LEARNING FRAMEWORK AND AI ACCELERATOR CARD

(71) Applicant: ZHEJIANG LAB, Zhejiang (CN)

(72) Inventors: Hongsheng Wang, Hangzhou (CN); Hujun Bao, Hangzhou (CN); Wei Hua, Hangzhou (CN); Weiqiang Jia, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 96 days.

(21) Appl. No.: 17/739,205

(22) Filed: May 9, 2022

(65) Prior Publication Data

US 2023/0177312 A1     Jun. 8, 2023

(30) Foreign Application Priority Data

Dec. 8, 2021   (CN) .......................... 202111487478.8

(51) Int. Cl.
     *G06N 3/04*          (2006.01)
     *G06F 8/36*          (2018.01)
     (Continued)

(52) U.S. Cl.
     CPC .............. *G06N 3/0454* (2013.01); *G06F 8/36* (2013.01); *G06F 9/4881* (2013.01); *G06F 9/545* (2013.01)

(58) Field of Classification Search
     CPC .......... G06N 3/04; G06N 3/0454; G06T 1/20; G06F 9/4881; G06F 9/545
     See application file for complete search history.

(56) References Cited

U.S. PATENT DOCUMENTS 11,237,880 B1 *   2/2022   Raumann .............. G06F 9/5077
2019/0188560 A1     6/2019   Le et al.
(Continued)

FOREIGN PATENT DOCUMENTS

CN     108629408 A     10/2018
CN     110866610 A     3/2020
(Continued)

OTHER PUBLICATIONS

Chowdhury, M.R., 2019. Scaling a convolutional neural network based Flower counting application in a distributed GPU cluster (Doctoral dissertation, University of Saskatchewan). (Year: 2019).*

(Continued)

*Primary Examiner* — Oluwatosin O Alabi
(74) *Attorney, Agent, or Firm* — W&G Law Group

(57) ABSTRACT

Disclosed is a method for distributed type training adaptation and apparatus in a deep learning framework and an AI accelerator card. The method includes the following steps: S1: the deep learning framework supports single-card configuration in a newly added AI accelerator card, and substeps thereof are as follows: S11: the deep learning framework supports new hardware; S12: the deep learning framework supports a device thread of the new hardware; S13: the deep learning framework supports a memory operation of the new hardware; and S14: the deep learning framework supports an operator kernel function of the new hardware; S2: the deep learning framework supports multi-card configuration in the newly added AI accelerator card; S3: the deep learning framework supports tensor segmentation and multi-card distribution; and S4: the deep learning framework supports multi-card collective communication in the newly added AI accelerator card.

17 Claims, 5 Drawing Sheets

(51) Int. Cl.
    *G06F 9/48*     (2006.01)
    *G06F 9/54*     (2006.01)

(56) References Cited

U.S. PATENT DOCUMENTS

| | | | |
|---|---|---|---|
| 2019/0205745 A1* | 7/2019 | Sridharan | G06N 3/08 |
| 2020/0202246 A1* | 6/2020 | Lin | G06F 9/48 |
| 2021/0092069 A1* | 3/2021 | Musleh | H04L 45/08 |
| 2021/0133583 A1* | 5/2021 | Chetlur | G01C 21/3608 |

FOREIGN PATENT DOCUMENTS

| | | |
|---|---|---|
| CN | 110929883 A | 3/2020 |
| CN | 113420517 A | 9/2021 |

OTHER PUBLICATIONS

Mayer R, Jacobsen HA. Scalable deep learning on distributed infrastructures: Challenges, techniques, and tools. ACM Computing Surveys (CSUR). Feb. 5, 2020;53(1):1-37. (Year: 2020).*
CN First Office Action(202111487478.8); dated Jan. 20, 2022.
Training Framework of Multi-GPU Deep Neural Network Based on Virtualization; Date of Mailing: Feb. 15, 2018.
Sparse GPU Kernels for Deep Learning; Date of Mailing: Aug. 31, 2020.

* cited by examiner

METHOD FOR DISTRIBUTED TYPE TRAINING ADAPTATION AND APPARATUS IN DEEP LEARNING FRAMEWORK AND AI ACCELERATOR CARD

CROSS-REFERENCE TO RELATED APPLICATIONS

The present application claims priority to Chinese Application No. 202111487478.8, filed on Dec. 8, 2021, the contents of both of which are incorporated herein by reference in their entireties.

TECHNICAL FIELD

The present disclosure relates to the technical field of artificial intelligence and localization AI chips, in particular to a method for distributed type training adaptation and apparatus in a deep learning framework and an AI accelerator card.

BACKGROUND

As China attaches great importance to integrated circuits, it has become an important mission in the current artificial intelligence field to build domestic chips with mainstream deep learning frameworks to promote the development of intelligent computing.

The basic process for the mainstream deep learning frameworks to adapt to the domestic chips is that the mainstream deep learning frameworks integrate high-performance machine learning libraries of the domestic chips, support mainstream neural network operators, and support model deployment in various application scenarios, such as classification, detection, segmentation, style transfer and other models. However, a current method of the deep frameworks to adapt to the domestic chips is still immature for a large-scale distributed type training technology. Therefore, providing a deep learning framework and domestic chip multi-card collective communication adaptation method and process is the key link to promote a new generation of ultra-large model training solutions. In order to achieve the above objective, this field is faced with a realistic technical problem: how to solve the compatibility problem between commercial AI frameworks and multi-card collective communication in accelerator cards.

SUMMARY

An objective of the present disclosure is to provide a method for distributed type training adaptation and apparatus in a deep learning framework and an AI accelerator card, in order to overcome the shortcomings in the prior art.

In order to achieve the above objective, the present disclosure provides the following technical solution:

A method for distributed type training adaptation in a deep learning framework and an AI accelerator card includes the following steps:

S1: supporting single-card configuration in a newly added AI accelerator card by the deep learning framework, sub-steps thereof are as follows:

S11: supporting new hardware by the deep learning framework;

S12: supporting a device thread of the new hardware by the deep learning framework;

S13: supporting a memory operation of the new hardware by the deep learning framework; and S14: supporting an operator kernel function of the new hardware by the deep learning framework;

S2: supporting multi-card configuration in the newly added AI accelerator card by the deep learning framework;

S3: supporting tensor segmentation and multi-card distribution by the deep learning framework; and S4: supporting multi-card collective communication in the newly added AI accelerator card by the deep learning framework.

In an embodiment, the step S11 supporting new hardware by the deep learning framework, includes the following sub-steps:

S11: adding a new hardware device field to the deep learning framework: adding a new device type to the deep learning framework, creating an enumeration class of the device type, and adding a device field corresponding to the new hardware to the device type;

S112: registering the new hardware into the deep learning framework: registering the new hardware device field added in step S111 into the framework;

S113: adding context information of a new hardware basic software library to the deep learning framework: newly adding a class of the context information of the new hardware basic software library, adding a handle member variable configured to store a context information structure of the new hardware basic software library and a member function for obtaining a handle of the context information of the new hardware basic software library, but not specifying a device ID of a specific accelerator card managed by the context information; and S114: adding a program flow of the new hardware basic software library to the deep learning framework, including newly adding a handle for obtaining and executing a new hardware program flow and a new hardware program flow index generator.

In an embodiment, in step S113, the member function for obtaining the handle of the context information of the new hardware basic software library is added, the function of the function is to initialize the new hardware basic software library, hardware resources are allocated on a host, and the function must be called firstly before any other new hardware basic software library function is called.

In an embodiment, in step S114, a specific method for newly adding a handle for obtaining and executing a new hardware program flow is: according to a handle of the context information structure of the new hardware basic software library obtained in step S113, creating the handle for executing the program flow; and a function of the newly added new hardware program flow index generator includes generating a calculation program flow index and generating a collective communication program flow index, a collective communication program flow includes two program flows of copying a host memory to the new hardware and copying a new hardware memory to the host, and the above new hardware program flow index generator is configured to allocate a program flow ID to a current program flow.

In an embodiment, the step S12 supporting a device thread of the new hardware by the deep learning framework includes the following sub-steps:

S121: adding a thread structure of a new hardware device: creating a hardware device type thread structure, including following member variables: a task executor polling thread, a current task queue, a recall event, an event recall queue, and an event recall queue polling thread; and S122: registering the thread structure of the new hardware device: registering the hardware device thread structure added in step S121 into the deep learning framework, specific sub-steps are as follows:

S1221: creating a thread structure object of the new hardware device according to a new hardware program flow ID and a new hardware device ID; and S1222: registering the thread structure of the new hardware device into the deep learning framework according to the thread structure object of the new hardware device and the new hardware device field.

In an embodiment, a constructor function of the thread structure in step S121 completes the following functions:

(1) an operation mode of the operator kernel function: first, adding different tasks to a current kernel function task queue in turn, creating the task executor polling thread which is responsible for creating the corresponding executor according to different kernel function task information and using the executor to run a current kernel function task in the task queue, and secondly, after all tasks in the kernel function task queue are run, creating the event recall queue polling thread, and returning the processed tasks;

(2) obtaining the tasks: the task executor polling thread being responsible for obtaining the current task to be processed in turn from the current task queue;

(3) constructing an executor of a kernel function: constructing a target executor object that processes the current task according to a target executor ID of the current task and context information of a current thread; and (4) returning the processed tasks: after all the tasks in the above task queue are processed, starting the event recall queue polling thread, and the event recall queue polling thread being responsible for taking out and returning the processed tasks in the event recall queue in turn.

In an embodiment, the step S13 supporting a memory operation of the new hardware by the deep learning framework includes sub-steps as follows:

S131: adding a memory type field of the new hardware device;

S132: applying for a memory of a new hardware device type;

S133: adding a memory copy interface of the new hardware device type; and

S134: adding a memory allocation interface of the new hardware device.

In an embodiment, the step S132 applying for a memory of a new hardware device type includes two parts of memories:

first, applying for the memory of the new hardware device type for a tensor edge of a calculation graph in the new hardware device; and second, applying for a memory for a tensor edge of a calculation graph of cross-device collective communication, the memory includes two situations: when the memory needs to be copied from the host to the new hardware device, applying for the memory of the new hardware device type; and when the memory needs to be copied from the new hardware device to the host, applying for a memory of a host type.

In an embodiment, in step S133, the memory copy interface of the new hardware device type includes the following three situations:

first, in a situation of copying the memory from the host to the new hardware device, when it is judged that a source memory belongs to the memory of the host type and a target memory belongs to the memory of the new hardware device type, calling an API interface for copying the memory from the host to the new hardware device;

second, in a situation of copying the memory from the new hardware device to the host, when it is judged that the source memory belongs to the memory of the new hardware device type and the target memory belongs to the memory of the host type, calling an API interface for copying the memory from the new hardware device to the host; and third, in a situation of copying the memory from the new hardware device to another new hardware device, when it is judged that the source memory belongs to the memory of the new hardware device type and the target memory belongs to the memory of the new hardware device type, calling an API interface for copying the memory from the new hardware device to the new hardware device.

In an embodiment, the step S314 adding a memory allocation interface of the new hardware device includes the following sub-steps:

S1341: adding a memory allocation function of the new hardware device: when it is judged that a memory to be applied for is the memory of the new hardware device type, calling an API interface of memory allocation of the new hardware device and allocating the memory of a specified size;

S1342: adding a memory destructor function of the new hardware device: when it is judged that a memory to be reclaimed is the memory of the new hardware device type, calling an API interface of memory destruction of the new hardware device and reclaiming the memory of the specified size; and S1343: initializing the allocated memory of the new hardware device type: first, using the above memory allocation function of the new hardware device to allocate the memory of the new hardware device type and of the specified size; secondly, allocating a memory of a temporarily specified size on the current host; and finally, copying the memory of the temporary specified size from the host to the above allocated memory of the new hardware device type.

In an embodiment, the step S14 supporting an operator kernel function of the new hardware by the deep learning framework includes sub-steps as follows:

S141: adding a constructor of the operator kernel function that supports the new hardware device type: newly adding the constructor of the operator kernel function that supports the new hardware device type, the above constructor being configured to create the kernel function of different operators that support the new hardware device type;

S142: registering the operator kernel function that supports the new hardware device type, the specific sub-steps are as follows:

S1421: using the constructor of the operator kernel function added in step S141 to generate a hash table storing a kernel function name and a kernel function key-value pair;

S1422: obtaining the kernel function name according to the device type and a data type of the operator kernel function, and using the kernel function name to obtain the kernel function from the above hash table; and S1423: registering the above obtained kernel function into the corresponding operator;

S143: registering kernel functions of system-level operators: using the constructor of the operator kernel function that supports the new hardware device type added in steps S141 and S142 and registering the operator kernel function that supports the new hardware device type to sequentially create and register following system-level operators: an input/output operator, a kernel function loading operator, and a weight/bias variable operator; and S144: newly adding kernel functions of user-level operators: adding forward/reverse kernel functions of different operators supporting the new hardware device type required for building a deep neural network model and registering into the corresponding operators, the specific sub-steps are as follows:

S1441: inheriting a kernel function class of the new hardware device type from an operator kernel function class of the deep learning framework;

S1442: using a kernel function registration mechanism of the deep learning framework to register the operator kernel function into a registration template with device type parameters; and S1443: using a specified new hardware device type to instantiate the above kernel function registration template.

In an embodiment, in step S141, the constructor of the operator kernel function is implemented by a global static hash table, a key value stores names of different operator kernel functions, and a value stores the corresponding kernel function.

In an embodiment, the step S2 supporting multi-card configuration in the newly added AI accelerator card by the deep learning framework, and requiring the deep learning framework to support context information of new hardware multi-card management, includes specific sub-steps as follows:

S21: newly adding the class of the context information of the new hardware basic software library;

S22: adding a member variable that stores and manages a container type of a plurality of context information structure handles of a plurality of accelerator cards; and S23: adding a member function for obtaining the above context information handles, a function of the function is to initialize the new hardware basic software library, and the function obtains the corresponding container member of the above context information according to a device ID of a specified on-chip accelerator card.

In an embodiment, the step S3 supporting tensor segmentation and multi-card distribution by the deep learning framework, includes sub-steps as follows:

S31: supporting tensor segmentation by the deep learning framework: in a distributed type training process of the deep learning framework, deriving to generate a physical calculation graph from a logical calculation graph in a compilation process of a deep learning compiler, and allocating a tensor between upstream and downstream nodes by using a tensor segmentation and broadcasting mode;

S32: creating and registering an asynchronous memory copier of the new hardware device; and S33: supporting tensor multi-card distribution by the deep learning framework: using the asynchronous memory copier of the new hardware device registered in step S32 to distribute tensor components obtained by segmentation in step S31 to a plurality of cards, specific steps are: first, determining a memory copy situation according to a source memory type and a target memory type; and secondly, using the asynchronous memory copier of the new hardware device in step S32 to distribute the tensor components segmented in step S31 to the plurality of cards for the determined memory copy situation.

In an embodiment, the asynchronous memory copier of the new hardware device includes the following four situations:

first, in a situation of copying the memory from the host to the new hardware device, when it is judged that a source memory belongs to a memory of a host type and a target memory belongs to the memory of the new hardware device type, calling an API interface for copying the memory from the host to the new hardware device;

second, in a situation of copying the memory from the new hardware device to the host, when it is judged that the source memory belongs to the memory of the new hardware device type and the target memory belongs to the memory of the host type, calling an API interface for copying the memory from the new hardware device to the host;

third, in a situation of copying the memory from the new hardware device to another new hardware device, when it is judged that the source memory belongs to the memory of the new hardware device type and the target memory belongs to the memory of the new hardware device type, calling an API interface for copying the memory from the new hardware device to the new hardware device; and fourth, in a situation of copying the memory from the host to another host, when it is judged that the source memory belongs to the memory of the host type and the target memory belongs to the memory of the host type, calling an API interface for copying the memory from the host to the host.

In an embodiment, in step S32, when a user specifies underlying hardware of the deep learning framework as the new hardware device type, the created asynchronous memory copier of the new hardware device is registered as a default memory copier according to the new hardware device type specified by the user.

In an embodiment, the step S4 supporting multi-card collective communication in the newly added AI accelerator card by the deep learning framework has a goal to aggregate forward calculation results of all the cards for each card, and according to different aggregation modes, sub-steps of supporting multi-card collective communication in the newly added AI accelerator card by the deep learning framework include two solutions of collective communication based on Ring AllReduce operation and collective communication based on AllReduce operation:

collective communication based on Ring AllReduce operation means that each card aggregates the forward calculation results of all the cards in a mode of tensor addition, and sub-steps of supporting multi-card collective communication in the newly added AI accelerator card by the deep learning framework in this aggregation mode are as follows:

step 1: traversing all the cards and copying an input cache of each card to the corresponding output cache; and step 2: traversing all the cards, and performing tensor addition operation between the output cache of a current card and the input cache of all other cards; and the collective communication mode based on AllReduce operation is to use the host as a central node, first globally reduce and receive data of all other nodes, and then broadcast back to all other nodes after local calculation, and sub-steps of supporting multi-card collective communication in the newly added AI accelerator card by the deep learning framework in this aggregation mode are as follows:

step 1: traversing all the cards, copying an input cache of each card from a current accelerator card to a temporary memory variable of the host, and accumulating temporary result memory variables of the host and a currently copied temporary memory variable of the host; and step 2: traversing all the cards, and copying an input cache memory of all the cards with the temporary result memory variables of the host finally being accumulated from the host to the output cache of each card.

The present disclosure further provides a distributed type training adaptation apparatus in a deep learning framework and an AI accelerator card, including one or a plurality of processors, configured to implement the method for distributed type training adaptation in the deep learning framework and the AI accelerator card.

The present disclosure further provides a computer-readable storage medium, a program is stored thereon, and the program, when executed by a processor, implements the method for distributed type training adaptation in the deep learning framework and the AI accelerator card.

The present disclosure has the beneficial effects: the present disclosure opens up the deep learning framework with the newly added AI accelerator card, fully integrates a source code of the deep learning framework with underlying software of a chip, releases the hardware capability of the chip to the greatest extent, provides the most powerful hashrate for end-side AI and supports multi-card collective communication in the AI accelerator card. Aiming at the on-chip distributed type parallel training function of newly added hardware, the present disclosure improves the utilization rate of hardware resources during training, and further improves the performance of a system.

The features and advantages of the present disclosure will be described in detail with reference to the accompanying drawings through embodiments.

DESCRIPTION OF EMBODIMENTS

In order to make objectives, technical solutions and advantages of the present disclosure more clear, the present disclosure will be further described in detail below through the accompanying drawings and embodiments. However, it should be understood that the specific embodiments described herein are only used to explain the present disclosure, and not to limit the scope of the present disclosure. Also, in the following description, descriptions of well-known structures and techniques are omitted to avoid unnecessarily obscuring the concepts of the present disclosure.

Figure 1:
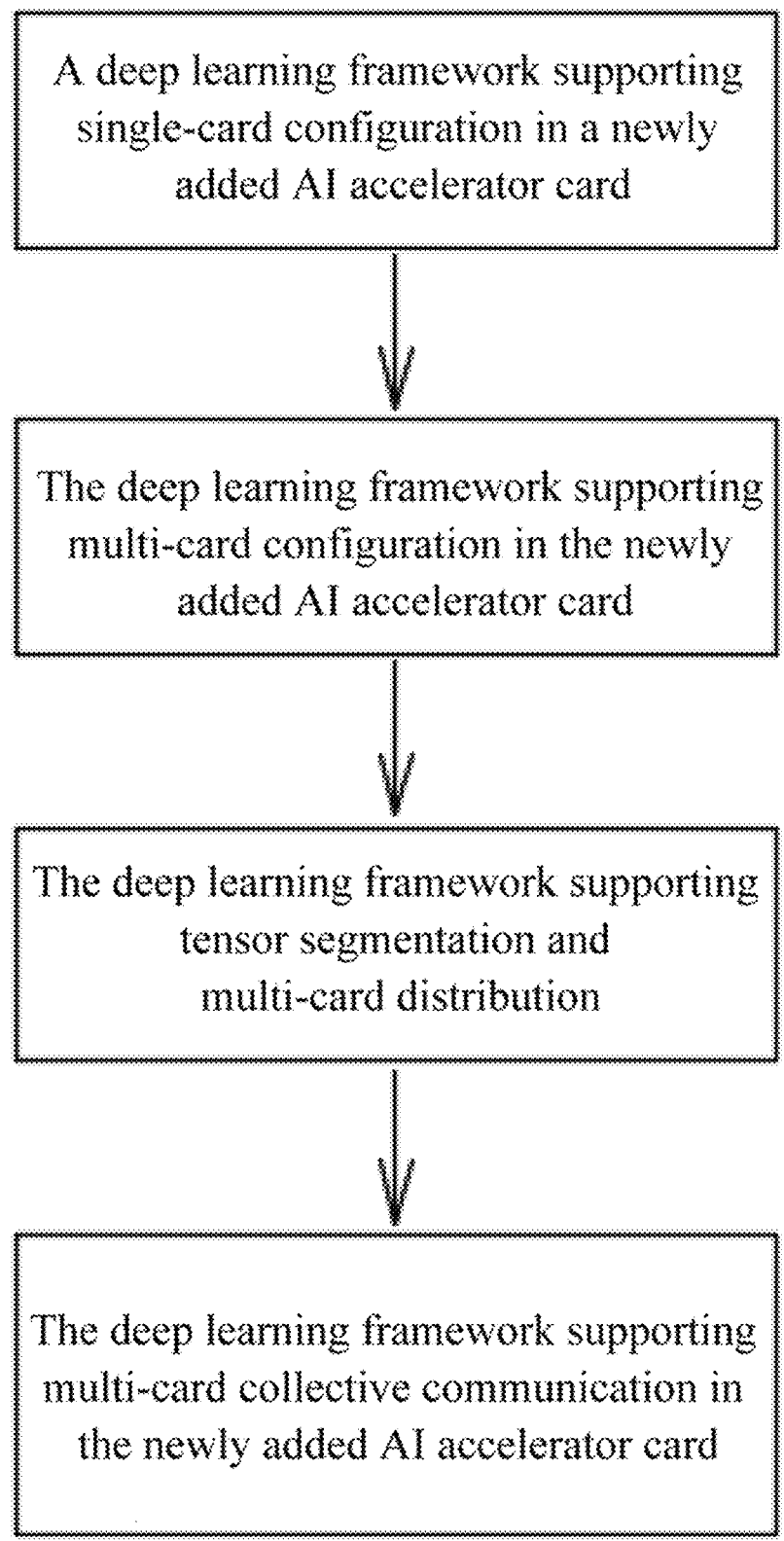
FIG. 1 is a step diagram of a method for distributed type training adaptation in a deep learning framework and an AI accelerator card.

Referring to FIG. 1, an embodiment of the present disclosure provides a method for distributed type training adaptation in a deep learning framework and an AI accelerator card, including the following steps:

S1: a deep learning framework supports single-card configuration in a newly added AI accelerator card;

S2: the deep learning framework supports multi-card configuration in the newly added AI accelerator card;

S3: the deep learning framework supports tensor segmentation and multi-card distribution; and S4: the deep learning framework supports multi-card collective communication in the newly added AI accelerator card.

The process of step S1 supporting single-card configuration in the newly added AI accelerator card by the deep learning framework is as follows:

S11: The deep learning framework supports new hardware, and the process is as follows:

S111: A new hardware device field is added to the deep learning framework. A new device type is added to the deep learning framework, an enumeration class of the device type is created, and a device field corresponding to the new hardware is added to the device type.

S112: The new hardware is registered into the deep learning framework. The new hardware device field added in the previous step is registered into the framework.

S113: Context information of a new hardware basic software library is added to the deep learning framework. A class of the context information of the new hardware basic software library is newly added. A handle member variable configured to store a context information structure of the new hardware basic software library and a member function for obtaining a handle of the context information of the new hardware basic software library are added, but a device ID of a specific accelerator card managed by the context information is not specified. The function of the function is to initialize the new hardware basic software library, hardware resources are allocated on a host, and the function must be called firstly before any other new hardware basic software library function is called. A method of supporting single-card configuration in the AI accelerator card by the deep learning framework is: one handle of the context information structure of the new hardware basic software library manages one accelerator card, specifically, one handle of the context information structure allocates a handle storage address of one on-chip accelerator card.

S114: A program flow of the new hardware basic software library is added to the deep learning framework, including: a handle for obtaining and executing a new hardware program flow and a new hardware program flow index generator are newly added.

1. The handle for obtaining and executing the new hardware program flow is newly added: according to the handle of the context information structure of the new hardware basic software library obtained in the above step, the handle for executing the program flow is created.

2. The new hardware program flow index generator are newly added: a function of the newly added new hardware program flow index generator includes generating a calculation program flow index and generating a collective communication program flow index, a collective communication program flow includes two program flows of copying a host memory to the new hardware and copying a new hardware memory to the host, and the above new hardware program flow index generator is configured to allocate a program flow ID to a current program flow.

S12: The deep learning framework supports a device thread of the new hardware, and the process is as follows:

S121: A thread structure of a new hardware device is added.

Figure 2:
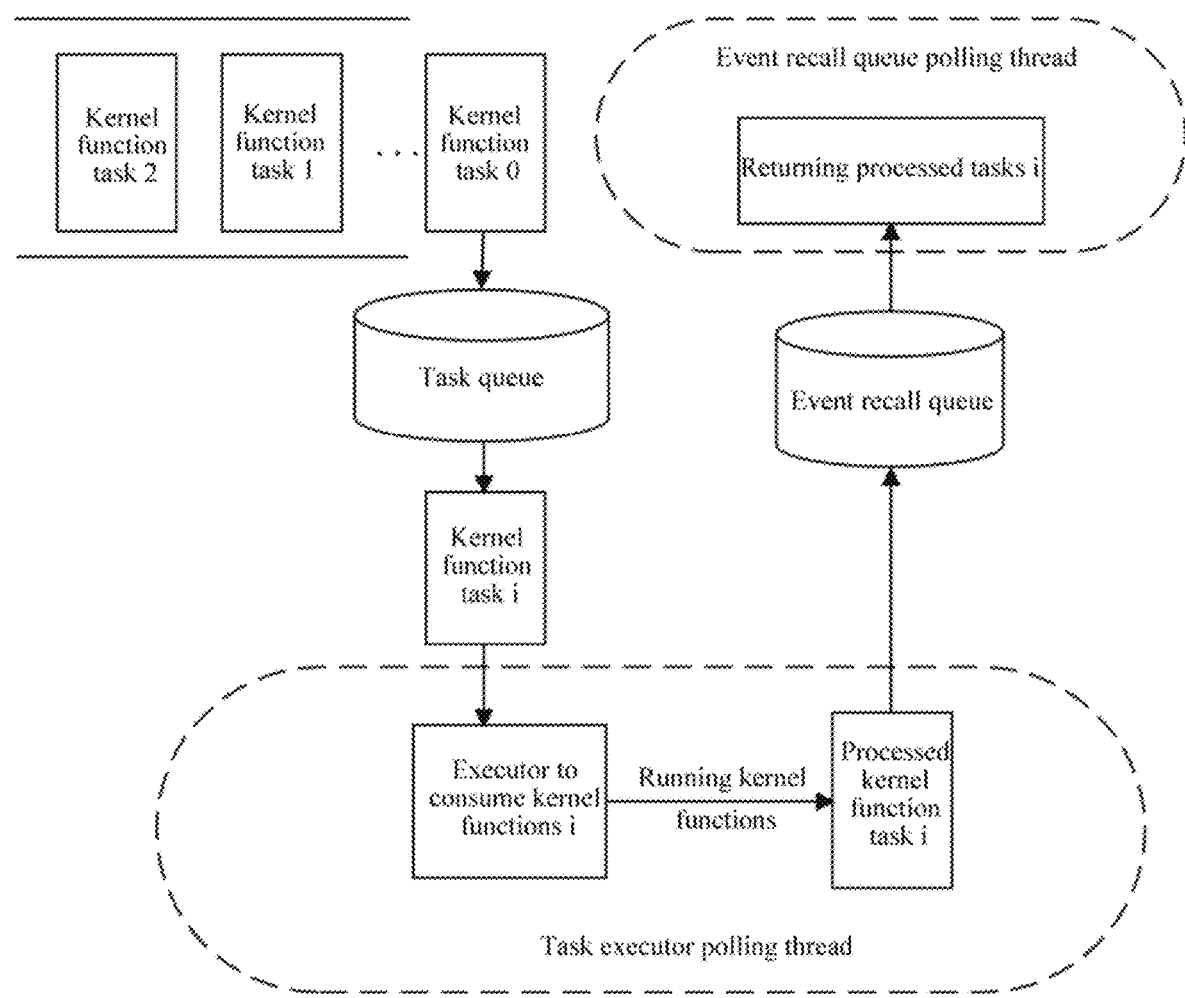
FIG. 2 is a schematic diagram of an operation mode of different operator kernel functions.

First, a hardware device type thread structure is created, including following member variables: a task executor polling thread, a current task queue, a recall event, an event recall queue, and an event recall queue polling thread. A constructor function of the structure completes the following functions:

(1) An operation mode of an operator kernel function: an operation mode of the operator kernel function is shown in FIG. 2, kernel functions that run different operators are regarded as different tasks, and executors of the kernel functions are constructed to run the kernel functions. First, the different tasks are added to a current kernel function task queue in turn, and the task executor polling thread is created and is responsible for creating the corresponding executors according to different kernel function task information and using the executors to run a current kernel function task in the task queue. Secondly, after all tasks in the kernel function task queue are run, the event recall queue polling thread is created, and the processed tasks are returned.

(2) The tasks are obtained: the task executor polling thread is responsible for obtaining the current task to be processed in turn from the current task queue.

(3) The executors of the kernel functions are constructed: a target executor object that processes the current task is constructed according to a target executor ID of the current task and context information of a current thread.

(4) The processed tasks are returned: after all the tasks in the above task queue are processed, the event recall queue polling thread is started. The event recall queue polling thread is responsible for taking out and returning the processed tasks in the event recall queue in turn.

S122: The thread structure of the new hardware device is registered. The hardware device thread structure newly added in the above first step is registered into the deep learning framework.

1. A thread structure object of the new hardware device is created according to a new hardware program flow ID and a new hardware device ID.

2. The thread structure of the new hardware device is registered into the deep learning framework according to the thread structure object of the new hardware device and the new hardware device field.

S13: The deep learning framework supports a memory operation of the new hardware, and the process is as follows:

S131: A memory type field of the new hardware device is added.

S132: A memory of a new hardware device type is applied for: applying for the memory of the new hardware device type includes two parts of memories: first, the memory of the new hardware device type is applied for a tensor edge of a calculation graph in the new hardware device; and second, a memory is applied for a tensor edge of a calculation graph of cross-device collective communication, the memory includes two situations: when the memory needs to be copied from the host to the new hardware device, the memory of the new hardware device type is applied for; and when the memory needs to be copied from the new hardware device to the host, a memory of a host type is applied for.

S133: A memory copy interface of the new hardware device type is added: the memory copy interface of the new hardware device type includes the following three situations:

first, in a situation of copying the memory from the host to the new hardware device, when it is judged that a source memory belongs to the memory of the host type and a target memory belongs to the memory of the new hardware device type, an API interface for copying the memory from the host to the new hardware device is called;

second, in a situation of copying the memory from the new hardware device to the host, when it is judged that the source memory belongs to the memory of the new hardware device type and the target memory belongs to the memory of the host type, an API interface for copying the memory from the new hardware device to the host is called; and third, in a situation of copying the memory from the new hardware device to another new hardware device, when it is judged that the source memory belongs to the memory of the new hardware device type and the target memory belongs to the memory of the new hardware device type, an API interface for copying the memory from the new hardware device to the new hardware device is called.

S134: A memory allocation interface of the new hardware device is added: allocating the memory for the new hardware includes the following steps:

S1341: A memory allocation function of the new hardware device is added. When it is judged that a memory to be applied for is the memory of the new hardware device type, an API interface of memory allocation of the new hardware device is called and the memory of a specified size is allocated.

S1342: A memory destructor function of the new hardware device is added: when it is judged that a memory to be reclaimed is the memory of the new hardware device type, an API interface of memory destruction of the new hardware device is called and the memory of the specified size is reclaimed.

S1343: The allocated memory of the new hardware device type is initialized. The process of initializing the allocated memory of the new hardware device type is as follows: first, the above memory allocation function of the new hardware device is configured to allocate the memory of the new hardware device type and of the specified size; secondly, a memory of a temporarily specified size is allocated on the current host; and finally, the temporary memory is copied from the host to the above allocated memory of the new hardware device type.

S14: The deep learning framework supports the operator kernel function of the new hardware, and the process is as follows:

S141: A constructor of the operator kernel functions that support the new hardware device type is added. The constructor of the operator kernel functions that support the new hardware device type is newly added, the above constructor is configured to create the kernel functions of different operators that support the new hardware device type. The constructor of the operator kernel functions is implemented by a global static hash table, a key value stores names of different operator kernel functions, and a value stores the corresponding kernel function. The above hash table is generated according to an input device type corresponding to the new hardware and structures of different operator kernel functions. Therefore, the operator kernel functions generated by the above constructor all support the above new hardware.

S142: The operator kernel functions that support the new hardware device type are registered. First, the constructor of the operator kernel functions in the above step is configured to generate a hash table storing kernel function names and kernel function key-value pairs; secondly, the kernel function names are obtained according to the device type and a data type of the operator kernel functions, and the kernel function names are configured to obtain the kernel functions from the above hash table; and finally, the above obtained kernel functions are registered into the corresponding operators.

S143: Kernel functions of system-level operators are registered. The constructor of the operator kernel functions that support the new hardware device type added above and the step of registering the operator kernel functions that support the new hardware device type are used to sequentially create and register following system-level operators: an input/output operator, a kernel function loading operator, and a weight/bias variable operator.

S144: Kernel functions of user-level operators are newly added. Forward/backward kernel functions of different operators supporting the new hardware device type required for building a deep neural network model are added and registered into the corresponding operators. A specific implementation method is as follows: first, a kernel function class of the new hardware device type is inherited from an operator kernel function class of the deep learning framework; secondly, a kernel function registration mechanism of the deep learning framework is configured to register the operator kernel functions into a registration template with device type parameters; and finally, a specified new hardware device type is configured to instantiate the above kernel function registration template.

The process of step S2 supporting multi-card configuration in the newly added AI accelerator card by the deep learning framework is as follows:

The deep learning framework supports context information of new hardware multi-card management. In order to operate the kernel function of each node operator, the memory of each tensor edge, and the collective communication between on-chip cards by the deep learning framework, target device ID information needs to be obtained. Therefore, supporting multi-card configuration in the AI accelerator card requires instantiating each on-chip accelerator card as a device type and assigning a device ID, and one above context information object manages one accelerator card. When the device information is constructed, one above context information object is constructed according to the device ID of each accelerator card; and when the device information is used, the device ID of the corresponding accelerator card may be obtained through the above context information object corresponding to a target device.

Since the method of supporting single-card configuration in the AI accelerator card by the deep learning framework is that one handle of the context information structure of the new hardware basic software library manages one accelerator card. Therefore, configuration of a plurality of on-chip cards needs to apply for a plurality of handles of the context information structure of the new hardware basic software library, where each handle of the context information structure of the new hardware basic software library manages the respective accelerator card. The specific implementation method is as follows: a class of context information of the hardware base software library is newly added. First, a member variable that stores and manages a container type of the plurality of context information structure handles of the plurality of accelerator cards is added; and secondly, a member function for obtaining the above context information handles is added, and a function of the function is to initialize the new hardware basic software library. The above function obtains the corresponding container member of the above context information according to the device ID of a specified on-chip accelerator card.

The process of step S3 supporting tensor segmentation and multi-card distribution by the deep learning framework, includes the following steps:

S31: The deep learning framework supports tensor segmentation. An implementation method of supporting tensor segmentation by the deep learning framework is as follows: in a distributed type training process of the deep learning framework, when a physical calculation graph is derived and generated from a logical calculation graph in a compilation process of a deep learning compiler, a tensor between upstream and downstream nodes is allocated by using a tensor segmentation and broadcasting mode. Input and output tensor edges of each node are allocated according to the above method of constructing the physical graph. The tensor edges of the compiled physical calculation graph above have been marked on which machine and which device they are on, a memory type, offset of blocks which they belong to, etc. In the running phase, a calculation graph runner only needs to transfer the tensors to each accelerator card according to meta-information of the tensor edges of the calculation graph generated at compile time.

S32: An asynchronous memory copier of the new hardware device is created and registered. Through the above step 1, the deep learning framework segments the input tensors, and then needs to distribute tensor components obtained from the above segmentation to the plurality of cards. Therefore, the asynchronous memory copier of the new hardware device needs to be used to distribute the above components to the plurality of cards. Creating and registering the asynchronous memory copier of the new hardware device includes the following steps:

Step 1: The asynchronous memory copier of the new hardware device is created. The asynchronous memory copier of the new hardware device includes the following four situations:

first, in a situation of copying the memory from the host to the new hardware device, when it is judged that the source memory belongs to the memory of the host type and the target memory belongs to the memory of the new hardware device type, the API interface for copying the memory from the host to the new hardware device is called;

second, in a situation of copying the memory from the new hardware device to the host, when it is judged that the source memory belongs to the memory of the new hardware device type and the target memory belongs to the memory of the host type, the API interface for copying the memory from the new hardware device to the host is called;

third, in a situation of copying the memory from the new hardware device to another new hardware device, when it is judged that the source memory belongs to the memory of the new hardware device type and the target memory belongs to the memory of the new hardware device type, the API interface for copying the memory from the new hardware device to the new hardware device is called; and fourth, in a situation of copying the memory from the host to another host, when it is judged that the source memory belongs to the memory of the host type and the target memory belongs to the memory of the host type, an API interface for copying the memory from the host to the host is called.

Step 2: The asynchronous memory copier of the new hardware device is registered. When a user specifies underlying hardware of the deep learning framework as the new hardware device type, the created asynchronous memory copier of the new hardware device is registered as a default memory copier according to the new hardware device type specified by the user.

S33: the deep learning framework supports tensor multi-card distribution. The asynchronous memory copier of the new hardware device obtained in the above step is configured to distribute the tensor components obtained by above segmentation to the plurality of cards. First, a memory copy situation is determined according to a source memory type and a target memory type; and secondly, the above asynchronous memory copier of the new hardware device is configured to distribute the tensor components segmented above to the plurality of cards for the above determined memory copy situation.

The process of step S4 supporting multi-card collective communication in the newly added AI accelerator card by the deep learning framework is as follows:

The process of supporting multi-card collective communication of the new hardware by the deep learning framework is as follows: in the situation of distributed type training of a deep learning model, such as data parallelism, during forward propagation, when the quantity of the accelerator cards is 4 and the batch is 4, the data is divided into 4 parts after the above step 1, and divided into 4 cards. Each card performs its own forward calculation; and during backward propagation, each card requires forward calculation results on all 4 cards to calculate the backward. Therefore, before backward propagation, each card needs to aggregate the forward calculation results on other cards.

Figure 3:
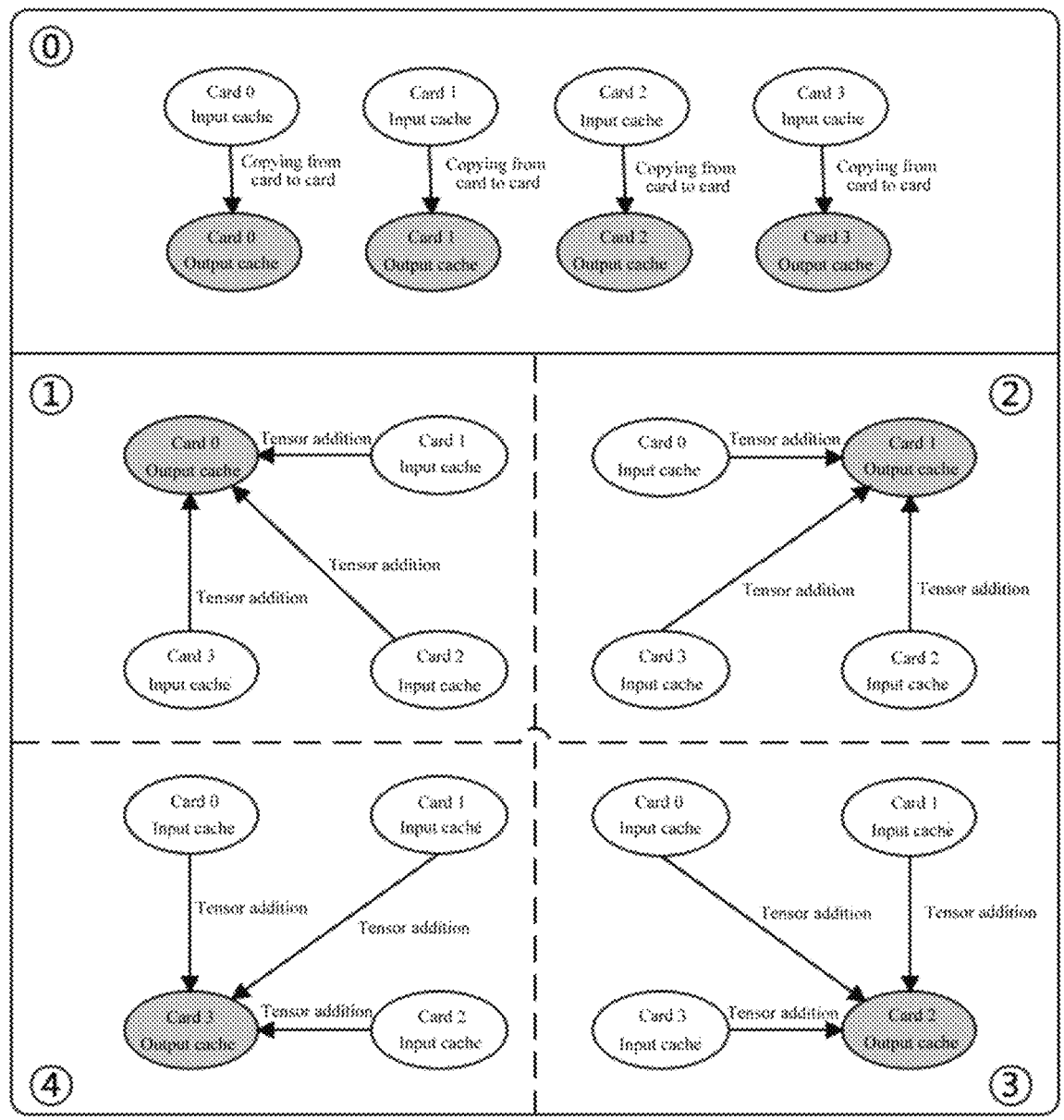
FIG. 3 is a process schematic diagram that each card aggregates forward calculation results of all cards in a mode of tensor addition according to an embodiment of the present disclosure.

The goal of supporting multi-card collective communication of the new hardware by the deep learning framework is to aggregate the forward calculation results of all the cards for each card. According to different aggregation modes, the present disclosure designs the following two solutions:

Solution 1, collective communication based on Ring AllReduce operation:

Collective communication based on Ring AllReduce operation means that each card aggregates the forward calculation results of all the cards in a mode of tensor addition, as shown in FIG. 3. The specific steps are as follows:

step 1: all the cards are traversed and an input cache of each card is copied to the corresponding output cache, as shown in ① in FIG. 3; and step 2: all the cards are traversed, and tensor addition operation is performed on the output cache of a current card and the input cache of all other cards, as shown in ①, ②, ③, ④ in FIG. 3.

Through the above steps, the output cache of each card has gathered the input cache of all the cards.

Figure 4:
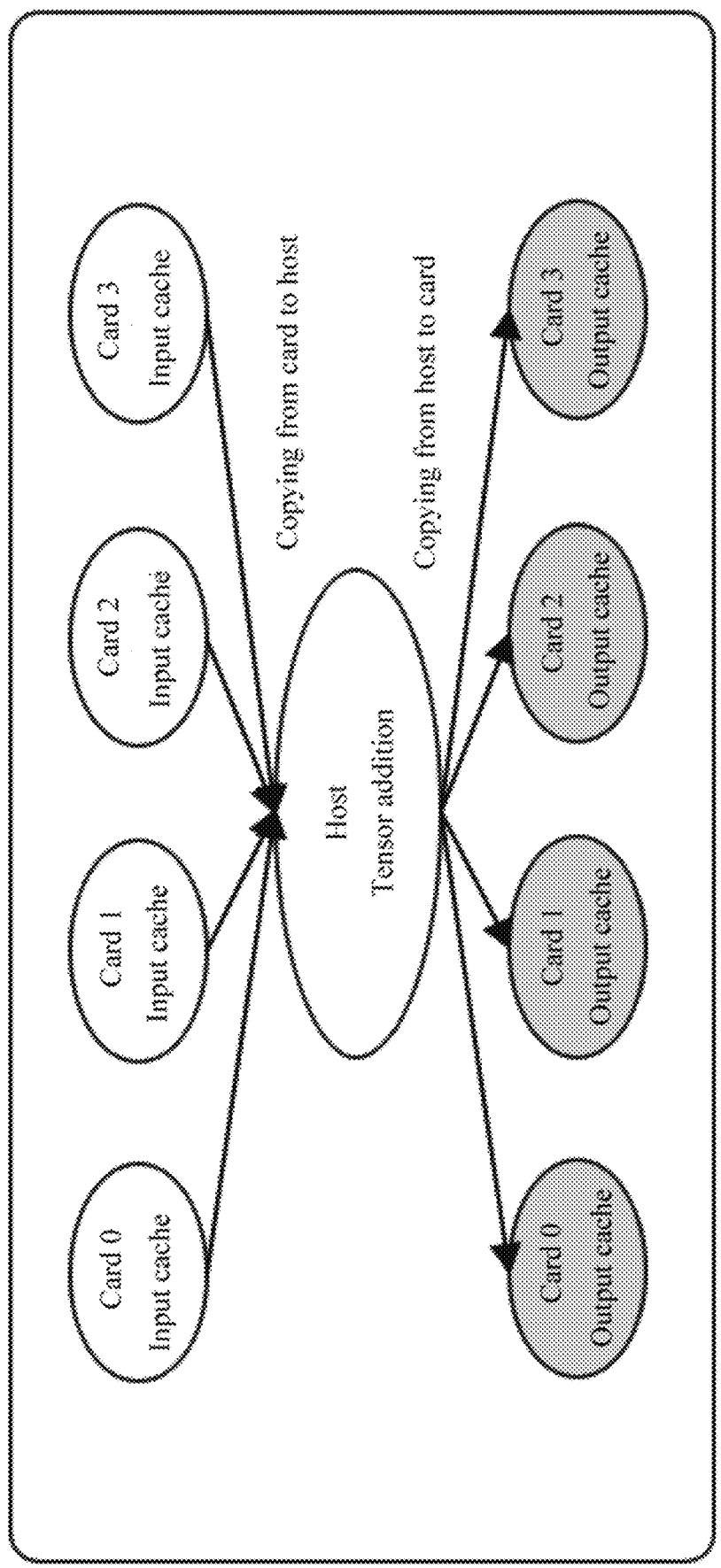
FIG. 4 is a process schematic diagram that each card aggregates forward calculation results of all cards in a mode of cross-device memory copy according to an embodiment of the present disclosure.

Solution 2, collective communication based on AllReduce operation:

The collective communication mode based on AllReduce operation is to use the host as a central node, first globally reduce and receive data of all other nodes, and then broadcast back to all other nodes after local calculation, as shown in FIG. 4. The specific steps are as follows:

step 1: all the cards are traversed, the input cache of each card is copied from a current accelerator card to a temporary memory variable of the host, and temporary result memory variables of the host are accumulated with a currently copied temporary memory variable of the host; and step 2: all the cards are traversed, and an input cache memory of all the cards with the temporary result memory variables of the host finally being accumulated is copied from the host to the output cache of each card.

Through the above steps, the output cache of each card has gathered the input cache of all the cards.

Through the above steps, the entire process of adapting the mainstream deep learning framework to the on-chip multi-card collective communication of an Enflame DTU 1.0 chip is completed. The following two test solutions, single-operator compatibility test and whole network test, are configured to test the performance of the deep learning framework for distributed type training and inference on on-chip multi-card of the Enflame chip.

Single-Operator Compatibility Test

The following is single-operator compatibility test on the Enflame DTU 1.0 chip by using the already docked deep learning framework. The docked deep learning framework is configured to run the forward and backward directions of convolution operators with different batch size sizes on the Enflame DTU 1.0 chip respectively, and compare the single card of the Enflame DTU 1.0 chip and 4 cards in the chip. The shape of a single-operator test input tensor is 224×224 and the quantity of channels is 3. The test results are as follows:

TABLE 1

Single-operator test

| Batch\Hardware | Convolution operator forward | | Convolution operator backward | |
| --- | --- | --- | --- | --- |
| | Single card | 4 cards | Single card | 4 cards |
| 4 | 0.297 | 0.215 | 2.269 | 2.993 |
| 8 | 0.513 | 0.272 | 2.425 | 3.020 |
| 16 | 0.962 | 0.375 | 2.890 | 3.232 |
| 32 | 7.000 | 0.588 | 9.030 | 3.662 |
| 64 | 14.000 | 1.024 | 16.380 | 4.40 |
| 128 | 25.000 | 8.213 | 27.000 | 11.99 |

Unit: Second

The test results show that, comparing the single card and the 4 cards in the Enflame DTU 1.0 chip, with the increase of the batch, the running speed of the 4 cards in the DTU accelerator card is faster than that of the single card, and the larger the batch, the more obvious the advantage of the convergence speed of the distributed type training of the 4 cards in the chip. Therefore, the compatibility of adapting the deep learning framework to on-chip multi-card collective communication of the Enflame DTU 1.0 chip is good.

Whole Network Test

The following is whole network test on the Enflame DTU 1.0 chip by using the already docked deep learning framework. The docked deep learning framework is configured to run the forward and backward directions of convolution operators with different batch_size sizes on the Enflame DTU 1.0 chip respectively, and compare the single card of the Enflame DTU 1.0 chip and 4 cards in the chip. The shape of a single-operator test input tensor is 224×224 and the quantity of channels is 3. The test results are as follows:

TABLE 2

ResNet50 network reasoning test result

| Batch\Hardware | ResNet50 Reasoning | |
|---|---|---|
| | Single card | 4 cards |
| 4 | 5.40 | 6.68 |
| 8 | 8.54 | 8.82 |
| 12 | 10.06 | 12.48 |
| 16 | NA | 15.38 |
| 32 | NA | 25.53 |
| 52 | NA | 34.65 |

Unit: Sample/Second

TABLE 3

ResNet50 network training test result

| Batch\Hardware | ResNet50 Training | |
|---|---|---|
| | Single card | 4 cards |
| 6 | 0.047 | 0.052 |
| 24 | NA | 0.087 |

Unit: Sample/Second

The test results show that comparing the single card of the Enflame DTU 1.0 chip and the 4 cards in the chip, with the increase of the batch, it is worth noting that an NA value indicates that due to the memory limitation of the chip accelerator card, the batch of the 4 cards is expanded, the available memory of each card is 2G, but for the memory management of the current accelerator card, if an upper framework applies for more than 2G of memory at one time, a bottom layer of the chip accelerator card will be unable to allocate, so the NA means that the framework layer cannot use a super batch of data. From the analysis of the test results, the running speed of the 4 cards in the DTU accelerator card is faster than that of the single card, and the larger the batch, the more obvious the advantage of the convergence speed of the distributed type training of the 4 cards in the chip. Therefore, the compatibility of adapting the deep learning framework to on-chip multi-card collective communication of the Enflame DTU 1.0 chip is good.

Corresponding to the foregoing embodiments of the method for distributed type training adaptation in the deep learning framework and the AI accelerator card, the present disclosure also provides an embodiment of a distributed type training adaptation apparatus in a deep learning framework and an AI accelerator card.

Figure 5:
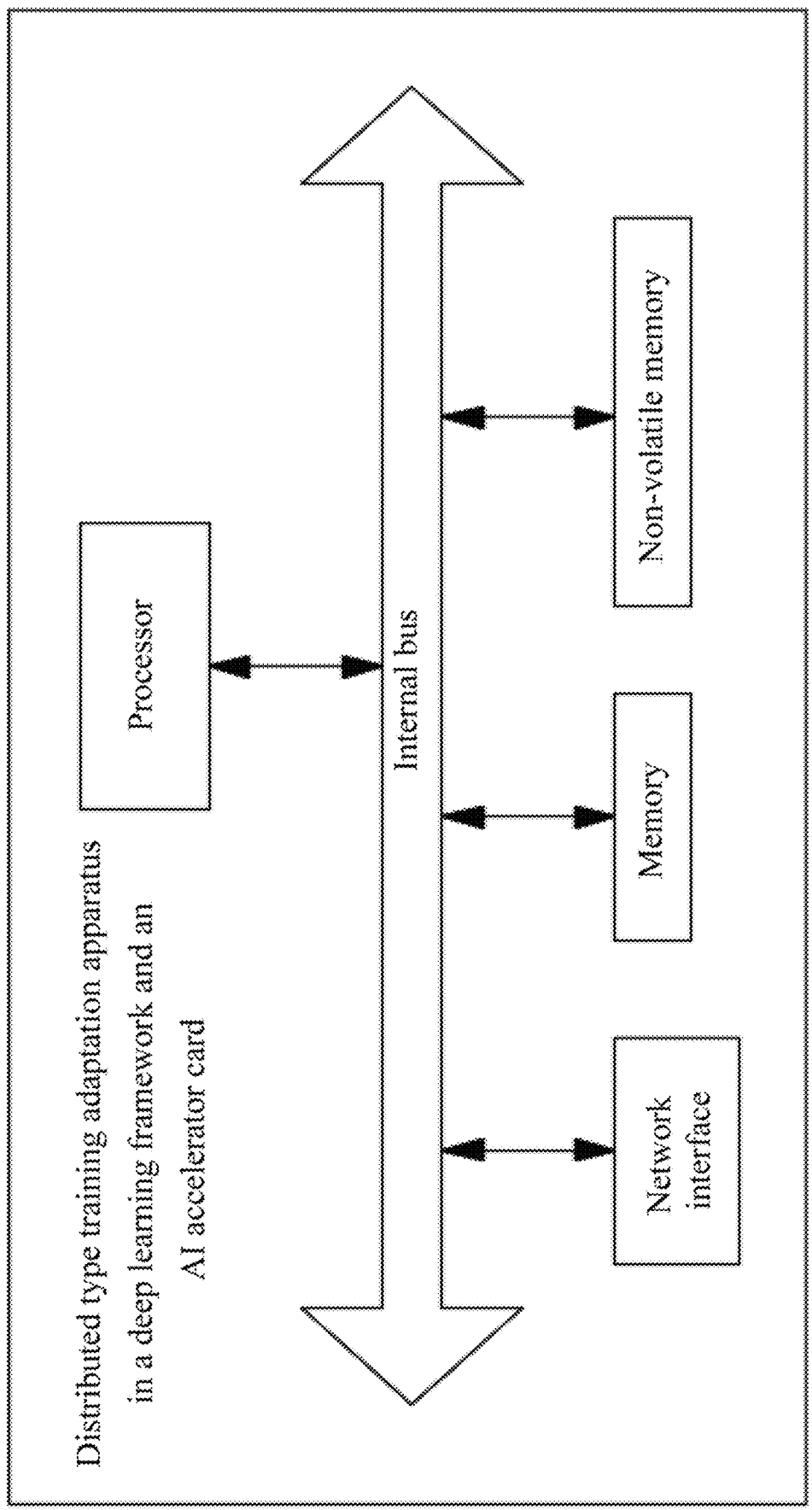
FIG. 5 is a schematic diagram of a distributed type training adaptation apparatus in a deep learning framework and an AI accelerator card.

Referring to FIG. 5, the distributed type training adaptation apparatus in the deep learning framework and the AI accelerator card provided by the embodiment of the present disclosure includes one or a plurality of processors, configured to implement the method for distributed type training adaptation in the deep learning framework and the AI accelerator card in the above embodiment.

The embodiment of the distributed type training adaptation apparatus in the deep learning framework and the AI accelerator card of the present disclosure may be applied to any device with data processing capability, which may be a device or apparatus such as a computer. The apparatus embodiment may be implemented by software, or may be implemented by hardware or a combination of software and hardware. Taking software implementation as an example, the apparatus in a logical sense is formed by reading the corresponding computer program instructions in a non-volatile memory into the memory through a processor of any device with the data processing capability where the apparatus is located. From the hardware level, as shown in FIG. 5, it is a hardware structure diagram of any device with the data processing capability where the distributed type training adaptation apparatus in the deep learning framework and the AI accelerator card is located, except for a processor, a memory, a network interface, and a non-volatile memory shown in FIG. 5, any device with the data processing capability where the apparatus in the embodiment is located may also include other hardware, usually according to the actual function of any device with the data processing capability, which will not be repeated here.

For details of the implementation process of the functions and roles of each unit in the above apparatus, please refer to the implementation process of the corresponding steps in the above method, which will not be repeated here.

As for the apparatus embodiment, since they basically correspond to the method embodiment, reference may be made to the partial descriptions of the method embodiments for related parts. The apparatus embodiment described above is only illustrative, where units described as separate components may or may not be physically separated, and components displayed as units may or may not be physical units, that is, they may be located in one place, or may be distributed on a plurality of network elements. Some or all of modules may be selected according to actual needs to achieve the objective of the solution of the present disclosure. Those ordinarily skilled in the art can understand and implement it without creative effort.

An embodiment of the present disclosure further provides a computer-readable storage medium on which a program is stored, and the program, when executed by a processor, implements the method for distributed type training adaptation in the deep learning framework and the AI accelerator card in the above embodiment.

The computer-readable storage medium may be an internal storage unit of any device with the data processing capability described in any one of the foregoing embodiments, such as a hard disk or a memory. The computer-readable storage medium may also be an external storage device of a wind turbine, such as a plug-in hard disk, a smart media card (SMC), an SD card, and a flash card equipped on the device. Further, the computer-readable storage medium may also include both the internal storage unit of any device with the data processing capability and the external storage device. The computer-readable storage medium is configured to store the computer program and other programs and data required by the device with the data processing capability, and may also be configured to temporarily store data that has been output or will be output.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

The above descriptions are only preferred embodiments of the present disclosure and are not intended to limit the present disclosure. Any modifications, equivalent replacements or improvements made within the spirit and principle of the present disclosure shall be included in the protection scope of the present disclosure.

What is claimed is:

1. A method for distributed type training adaptation in a deep learning framework and an Artificial Intelligence (AI) accelerator card, comprising the following steps:

S/1: supporting single-card configuration in a newly added AI accelerator card by the deep learning framework, wherein sub-steps thereof are as follows:

S11: supporting new hardware by the deep learning framework, wherein sub-steps are as follows:

S111: adding a new hardware device field by the deep learning framework: adding a new device type to the deep learning framework, creating an enumeration class of the device type, and adding a device field corresponding to the new hardware to the device type;

S112: registering the new hardware into the deep learning framework: registering the new hardware device field added in step S111 into the framework;

S113: adding context information of a new hardware basic software library to the deep learning framework: newly adding a class of the context information of the new hardware basic software library, adding a handle member variable configured to store a context information structure of the new hardware basic software library and a member function for obtaining a handle of the context information of the new hardware basic software library, but not specifying a device ID of a specific accelerator card managed by the context information; and S114: adding a program flow of the new hardware basic software library to the deep learning framework, comprising newly adding a handle for obtaining and executing a new hardware program flow and a new hardware program flow index generator;

S12: supporting a device thread of the new hardware by the deep learning framework, wherein sub-steps are as follows:

S121: adding a thread structure of a new hardware device: creating a hardware device type thread structure, comprising following member variables: a task executor polling thread, a current task queue, a recall event, an event recall queue, and an event recall queue polling thread; and S122: registering the thread structure of the new hardware device: registering the hardware device thread structure added in step S121 into the deep learning framework;

S13: supporting a memory operation of the new hardware by the deep learning framework, wherein sub-steps are as follows:

S131: adding a memory type field of the new hardware device;

S132: applying for a memory of a new hardware device type;

S133: adding a memory copy interface of the new hardware device type; and

S134: adding a memory allocation interface of the new hardware device; and

S14: supporting an operator kernel function of the new hardware by the deep learning framework, wherein sub-steps are as follows:

S141: adding a constructor of the operator kernel function that supports the new hardware device type: newly adding the constructor of the operator kernel function that supports the new hardware device type, the above constructor being configured to create the function of different operators that support the new hardware device type;

S142: registering the operator kernel function that supports the new hardware device type;

S143: registering kernel functions of system-level operators: using the constructor of the operator kernel function that supports the new hardware device type added in steps S141 and S142 and registering the operator kernel function that supports the new hardware device type to sequentially create and register following system-level operators: an input/output operator, a kernel function loading operator, and a weight/bias variable operator; and S144: newly adding kernel functions of user-level operators: adding forward/reverse kernel functions of different operators supporting the new hardware device type required for building a deep neural network model and registering into the corresponding operators;

S2: supporting multi-card configuration in the newly added AI accelerator card by the deep learning framework, and requiring the deep learning framework to support context information of new hardware multi-card management, wherein specific sub-steps are as follows:

S21: newly adding the class of the context information of the new hardware basic software library;

S22: adding a member variable that stores and manages a container type of a plurality of context information structure handles of a plurality of accelerator cards; and S23: adding a member function for obtaining the above context information handles, wherein a function of the function is to initialize the new hardware basic software library, and the function obtains the corresponding container member of the above context information according to a device ID of a specified on-chip accelerator card;

S3: supporting tensor segmentation and multi-card distribution by the deep learning framework, wherein specific sub-steps are as follows:

S31: supporting tensor segmentation by the deep learning framework: in a distributed type training process of the deep learning framework, deriving to generate a physical calculation graph from a logical calculation graph in a compilation process of a deep learning compiler, and allocating a tensor between upstream and downstream nodes by using a tensor segmentation and broadcasting mode;

S32: creating and registering an asynchronous memory copier of the new hardware device; and S33: supporting tensor multi-card distribution by the deep learning framework: using the asynchronous memory copier of the new hardware device registered in step S32 to distribute tensor components obtained by segmentation in step S31 to a plurality of cards, specific steps are: first, determining a memory copy situation according to a source memory type and a target memory type; and secondly, using the asynchronous memory copier of the new hardware device in step S32 to distribute the tensor components segmented in step S31 to the plurality of cards for the determined memory copy situation; and S4: supporting multi-card collective communication in the newly added AI accelerator card by the deep learning framework, wherein a goal is to aggregate forward calculation results of all the cards for each card, according to different aggregation modes, sub-steps of supporting multi-card collective communication in the newly added AI accelerator card by the deep learning framework comprise two solutions of collective communication based on Ring AllReduce operation and collective communication based on AllReduce operation:

collective communication based on Ring AllReduce operation means that each card aggregates the forward calculation results of all the cards in a mode of tensor addition; and the collective communication mode based on AllReduce operation is to use a host as a central node, first globally reduce and receive data of all other nodes, and then broadcast back to all other nodes after local calculation.

2. The method for distributed type training adaptation in the deep learning framework and the AI accelerator card according to claim 1, wherein in step S113, the member function for obtaining the handle of the context information of the new hardware basic software library is added, a function of the function is to initialize the new hardware basic software library, hardware resources are allocated on the host, and the function must be called firstly before any other new hardware basic software library function is called.

3. The method for distributed type training adaptation in the deep learning framework and the AI accelerator card according to claim 1, wherein in step S114, a specific method for newly adding a handle for obtaining and executing a new hardware program flow is:

according to a handle of the context information structure of the new hardware basic software library obtained in step S113, creating the handle for executing the program flow; and a function of the newly added new hardware program flow index generator comprises generating a calculation program flow index and generating a collective communication program flow index, a collective communication program flow comprises two program flows of copying a host memory to the new hardware and copying a new hardware memory to the host, and the above new hardware program flow index generator is configured to allocate a program flow ID to a current program flow.

4. The method for distributed type training adaptation in the deep learning framework and the AI accelerator card according to claim 1, wherein the step S122 registering the thread structure of the new hardware device, comprises the specific sub-steps:

S1221: creating a thread structure object of the new hardware device according to a new hardware program flow ID and a new hardware device ID; and S1222: registering the thread structure of the new hardware device into the deep learning framework according to the thread structure object of the new hardware device and the new hardware device field.

5. The method for distributed type training adaptation in the deep learning framework and the AI accelerator card according to claim 1, wherein a constructor function of the thread structure in step S121 completes the following functions:

an operation mode of the operator kernel function: first, adding different tasks to a current kernel function task queue in turn, creating the task executor polling thread which is responsible for creating the corresponding executor according to different kernel function task information and using the executor to run a current kernel function task in the task queue, and secondly, after all tasks in the kernel function task queue are run, creating the event recall queue polling thread, and returning the processed tasks;

obtaining the tasks: the task executor polling thread being responsible for obtaining the current task to be processed in turn from the current task queue;

constructing an executor of a kernel function: constructing a target executor object that processes the current task according to a target executor ID of the current task and context information of a current thread; and returning the processed tasks: after all the tasks in the above task queue are processed, starting the event recall queue polling thread, and the event recall queue polling thread being responsible for taking out and returning the processed tasks in the event recall queue in turn.

6. The method for distributed type training adaptation in the deep learning framework and the AI accelerator card according to claim 1, wherein the step S132 applying for a memory of a new hardware device type comprises two parts of memories:

first, applying for the memory of the new hardware device type for a tensor edge of a calculation graph in the new hardware device; and second, applying for a memory for a tensor edge of a calculation graph of cross-device collective communication, wherein the memory comprises two situations: when the memory needs to be copied from the host to the new hardware device, applying for the memory of the new hardware device type; and when the memory needs to be copied from the new hardware device to the host, applying for a memory of a host type.

7. The method for distributed type training adaptation in the deep learning framework and the AI accelerator card according to claim 1, wherein in step S133, the memory copy interface of the new hardware device type comprises the following three situations:

in a situation of copying the memory from the host to the new hardware device, when it is judged that a source memory belongs to a memory of a host type and a target memory belongs to the memory of the new hardware device type, calling an API interface for copying the memory from the host to the new hardware device;

in a situation of copying the memory from the new hardware device to the host, when it is judged that the source memory belongs to the memory of the new hardware device type and the target memory belongs to the memory of the host type, calling an API interface for copying the memory from the new hardware device to the host; and in a situation of copying the memory from the new hardware device to another new hardware device, when it is judged that the source memory belongs to the memory of the new hardware device type and the target memory belongs to the memory of the new hardware device type, calling an API interface for copying the memory from the new hardware device to the new hardware device.

8. The method for distributed type training adaptation in the deep learning framework and the AI accelerator card according to claim 1, wherein the step S314 adding a memory allocation interface of the new hardware device comprises the following sub-steps:

S1341: adding a memory allocation function of the new hardware device: when it is judged that a memory to be applied for is the memory of the new hardware device type, calling an API interface of memory allocation of the new hardware device and allocating the memory of a specified size;

S1342: adding a memory destructor function of the new hardware device: when it is judged that a memory to be reclaimed is the memory of the new hardware device type, calling an API interface of memory destruction of the new hardware device and reclaiming the memory of the specified size; and S1343: initializing the allocated memory of the new hardware device type: first, using the above memory allocation function of the new hardware device to allocate the memory of the new hardware device type and of the specified size; secondly, allocating a memory of a temporarily specified size on the current host; and finally, copying the memory of the temporary specified size from the host to the above allocated memory of the new hardware device type.

9. The method for distributed type training adaptation in the deep learning framework and the AI accelerator card according to claim 1, wherein the step S142 registering the operator kernel function that supports the new hardware device type comprises the following specific sub-steps:

S1421: using the constructor of the operator kernel function added in step S141 to generate a hash table storing a kernel function name and a kernel function key-value pair;

S1422: obtaining the kernel function name according to the device type and a data type of the operator kernel function, and using the kernel function name to obtain the kernel function from the above hash table; and S1423: registering the above obtained kernel function into the corresponding operator.

10. The method for distributed type training adaptation in the deep learning framework and the AI accelerator card according to claim 1, wherein the step S144 newly adding kernel functions of user-level operators comprises the following specific sub-steps:

S1441: inheriting a kernel function class of the new hardware device type from an operator kernel function class of the deep learning framework;

S1442: using a kernel function registration mechanism of the deep learning framework to register the operator kernel function into a registration template with device type parameters; and S1443: using a specified new hardware device type to instantiate the above kernel function registration template.

11. The method for distributed type training adaptation in the deep learning framework and the AI accelerator card according to claim 1, wherein in step S141, the constructor of the operator kernel function is implemented by a global static hash table, a key value stores names of different operator kernel functions, and a value stores the corresponding kernel function.

12. The method for distributed type training adaptation in the deep learning framework and the AI accelerator card according to claim 1, wherein in step S32, the asynchronous memory copier of the new hardware device comprises the following four situations:

first, in a situation of copying the memory from the host to the new hardware device, when it is judged that a source memory belongs to a memory of a host type and a target memory belongs to the memory of the new hardware device type, calling an API interface for copying the memory from the host to the new hardware device;

second, in a situation of copying the memory from the new hardware device to the host, when it is judged that the source memory belongs to the memory of the new hardware device type and the target memory belongs to the memory of the host type, calling an API interface for copying the memory from the new hardware device to the host;

third, in a situation of copying the memory from the new hardware device to another new hardware device, when it is judged that the source memory belongs to the memory of the new hardware device type and the target memory belongs to the memory of the new hardware device type, calling an API interface for copying the memory from the new hardware device to the new hardware device; and fourth, in a situation of copying the memory from the host to another host, when it is judged that the source memory belongs to the memory of the host type and the target memory belongs to the memory of the host type, calling an API interface for copying the memory from the host to the host.

13. The method for distributed type training adaptation in the deep learning framework and the AI accelerator card according to claim 1, wherein in step S32, when a user specifies underlying hardware of the deep learning framework as the new hardware device type, the created asynchronous memory copier of the new hardware device is registered as a default memory copier according to the new hardware device type specified by the user.

14. The method for distributed type training adaptation in the deep learning framework and the AI accelerator card according to claim 1, wherein in step S4, sub-steps of supporting multi-card collective communication in the newly added AI accelerator card by the deep learning framework in an aggregation mode of collective communication based on Ring AllReduce operation are as follows:

step 1: traversing all the cards and copying an input cache of each card to the corresponding output cache; and step 2: traversing all the cards, and performing tensor addition operation between the output cache of a current card and the input cache of all other cards.

15. The method for distributed type training adaptation in the deep learning framework and the AI accelerator card according to claim 1, wherein in step S4, sub-steps of supporting multi-card collective communication in the newly added AI accelerator card by the deep learning framework in an aggregation mode of collective communication based on AllReduce operation are as follows:

step 1: traversing all the cards, copying an input cache of each card from a current accelerator card to a temporary memory variable of the host, and accumulating temporary result memory variables of the host and a currently copied temporary memory variable of the host; and step 2: traversing all the cards, and copying an input cache memory of all the cards with the temporary result memory variables of the host finally being accumulated from the host to the output cache of each card.

16. A distributed type training adaptation apparatus in a deep learning framework and an AI accelerator card, comprising one or a plurality of processors, configured to implement the method for distributed type training adaptation in the deep learning framework and the AI accelerator card according to claim 1.

17. A computer-readable storage medium, wherein a program is stored thereon, and the program, when executed by a processor, implements the method for distributed type training adaptation in the deep learning framework and the AI accelerator card according to claim 1.

\* \* \* \* \*